(12) United States Patent
Hasegawa et al.

(10) Patent No.: US 8,798,398 B2
(45) Date of Patent: Aug. 5, 2014

(54) IMAGE PROCESSING APPARATUS

(75) Inventors: Hiromu Hasegawa, Osaka (JP); Munehiro Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1111 days.

(21) Appl. No.: 12/190,127

(22) Filed: Aug. 12, 2008

(65) Prior Publication Data
US 2009/0060389 A1    Mar. 5, 2009

(30) Foreign Application Priority Data

Aug. 27, 2007 (JP) .................. 2007-219448

(51) Int. Cl.
*G06K 9/32* (2006.01)
*G06K 9/00* (2006.01)

(52) U.S. Cl.
USPC .......................................... 382/300; 382/167

(58) Field of Classification Search
CPC ..... H04N 1/60; H04N 2209/046; H04N 9/69; H04N 9/77; H04N 9/78; H09N 1/6027; G06T 5/20; G06T 2207/20032; G06T 2207/10024; G06T 3/4007; G06F 17/17
USPC .................. 382/162, 163, 164, 165, 167, 300
See application file for complete search history.

(56) References Cited

U.S. PATENT DOCUMENTS

| 2002/0140828 | A1* | 10/2002 | Fukui et al. | 348/222.1 |
| 2005/0249404 | A1* | 11/2005 | Xiaomang | 382/162 |
| 2006/0198556 | A1* | 9/2006 | Chen et al. | 382/162 |
| 2006/0262196 | A1* | 11/2006 | Hasegawa et al. | 348/223.1 |
| 2007/0013786 | A1* | 1/2007 | Chiba et al. | 348/222.1 |
| 2008/0056618 | A1* | 3/2008 | Yoshino et al. | 382/300 |

FOREIGN PATENT DOCUMENTS

| JP | 2002-010279 | 1/2002 |
| JP | 2003-196649 | 7/2003 |
| JP | 2004-007167 | 1/2004 |
| JP | 2006-24999 | 1/2006 |

OTHER PUBLICATIONS

Office Action issued Jan. 4, 2012 in Japanese Patent Application No. 2007-219448 filed on Aug. 27, 2007.

* cited by examiner

*Primary Examiner* — Amir Alavi
*Assistant Examiner* — Kenny Cese
(74) *Attorney, Agent, or Firm* — Oblon, Spivak, McClelland, Maier & Neustadt, L.L.P.

(57) ABSTRACT

From an image pickup element, pixel signals of Bayer array are outputted. A correlation calculation part calculates correlation values with respect to a specified pixel in vertical and horizontal directions. A first interpolation part performs a pixel interpolation process while evaluating the correlation highly. A second interpolation part performs a pixel interpolation process while evaluating the correlation relatively low. A complete signal of RGB outputted from the first interpolation part is converted into a luminance signal in a first color space conversion part, and a complete signal of RGB outputted from the second interpolation part is converted into a color difference signal in a second color space conversion part.

11 Claims, 11 Drawing Sheets

IMAGE PROCESSING APPARATUS

BACKGROUND OF THE INVENTION

1. Field of the Invention

The present invention relates to an image processing apparatus for performing an appropriate interpolation process on a pixel signal including signals for some of color components in a predetermined color space.

2. Description of the Background Art

Image pickup elements, such as CCDs, CMOSs and the like which are used in digital still cameras and the like, perform photoelectric conversion of light received through color filters, to output pixel signals. Such color filters include RGB color filters, YMCK color filters and the like. Then, in a case of using a single-chip color filter, for one pixel, a pixel signal for one color is outputted. For example, in a case of using the RGB color filter, for one pixel, a pixel signal for one of R (Red) component, G (Green) component and B (Blue) component is outputted.

Thus, since the pixel signal outputted from an image pickup element comprising a single-chip color filter includes a single-color pixel signal per pixel, an interpolation process is performed for pixel signals for other color components. As to such an interpolation process, various algorithms are used.

For example, on a RAW image (an image before pixel interpolation), judgment is made on a correlation between a specified pixel and each surrounding pixel. Then, by using pixels in a direction where the correlation with respect to the specified pixel is high, color interpolation is performed. Thus performed is demosaicing from a RAW image to an RGB image.

In Japanese Patent Application Laid Open Gazette No. 2006-24999, with respect to a specified pixel, correlation values in four directions are calculated and a pixel interpolation process taking the correlation into account is performed.

As discussed above, the interpolation process is a process for estimating image data of the specified pixel from image data of the surrounding pixels. Therefore, when a RAW image having high noise is outputted from an image pickup sensor in a case of high photographic sensitivity or the like, it is not possible to reduce the noise even if the same interpolation process as in a case of low photographic sensitivity is performed. Further, due to high noise, correct judgment can not be always made on the correlation of the image even if it is attempted. Then, if wrong judgment is made on the correlation, there is a possibility of enhancing the noise. On the other hand, when a specified pixel is estimated by uniformly using the average pixel value of the surrounding pixels, it is possible to reduce the noise, but the sense of resolution of the interpolated image is degraded.

In summary, in the background-art technique, in the case of demosaicing for high noise RAW image, if it is intended to achieve good sense of resolution, the noise component is enhanced as its side effect, and if it is intended to remove noise, the sense of resolution is degraded as its side effect.

SUMMARY OF THE INVENTION

The present invention is intended for an image processing apparatus. According to an aspect of the present invention, the image processing apparatus comprises an input part for inputting a pixel signal for each pixel which includes a signal for one or some of color components in one color space, a correlation judgment part for judging a correlation between a specified pixel and a surrounding pixel by using pixel signals in a predetermined area around the specified pixel, a first pixel interpolation part for performing a first pixel interpolation process which evaluates the judged correlation on the specified pixel, a second pixel interpolation part for performing a second pixel interpolation process which evaluates the judged correlation on the specified pixel with a level different from that in the first pixel interpolation process, a first color space conversion part for generating one or some of color component signals in other color space from a pixel signal generated by the first pixel interpolation part, and a second color space conversion part for generating the other of color component signals in the other color space from a pixel signal generated by the second pixel interpolation part.

By the present invention, it is possible to use one of signals interpolated with different characteristics for each color signal to be generated by color space conversion and therefore possible to manipulate the characteristics of a generated image.

According to another aspect of the present invention, the first pixel interpolation process evaluates the correlation highly as compared with the second pixel interpolation process.

It is therefore possible to maintain the sense of resolution on the pixel signal generated in the first pixel interpolation process.

According to still another aspect of the present invention, one or some of color component signals in the other color space includes a luminance signal in the other color space.

Since the luminance signal in the color space after conversion is generated from the pixel signal obtained with the correlation evaluated highly, it is possible to maintain the sense of resolution of the generated image.

According to yet another aspect of the present invention, the other of color component signals in the other color space includes a color difference signal in the other color space.

Since the color difference signal in the color space after conversion is generated from the pixel signal obtained with the correlation evaluated low, it is possible to suppress a color noise component of the generated image.

Therefore, it is an object of the present invention to provide an interpolation technique to avoid loss of the sense of resolution in luminance component while suppressing the color noise component of the interpolated image even in a case of inputting an image having high noise.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
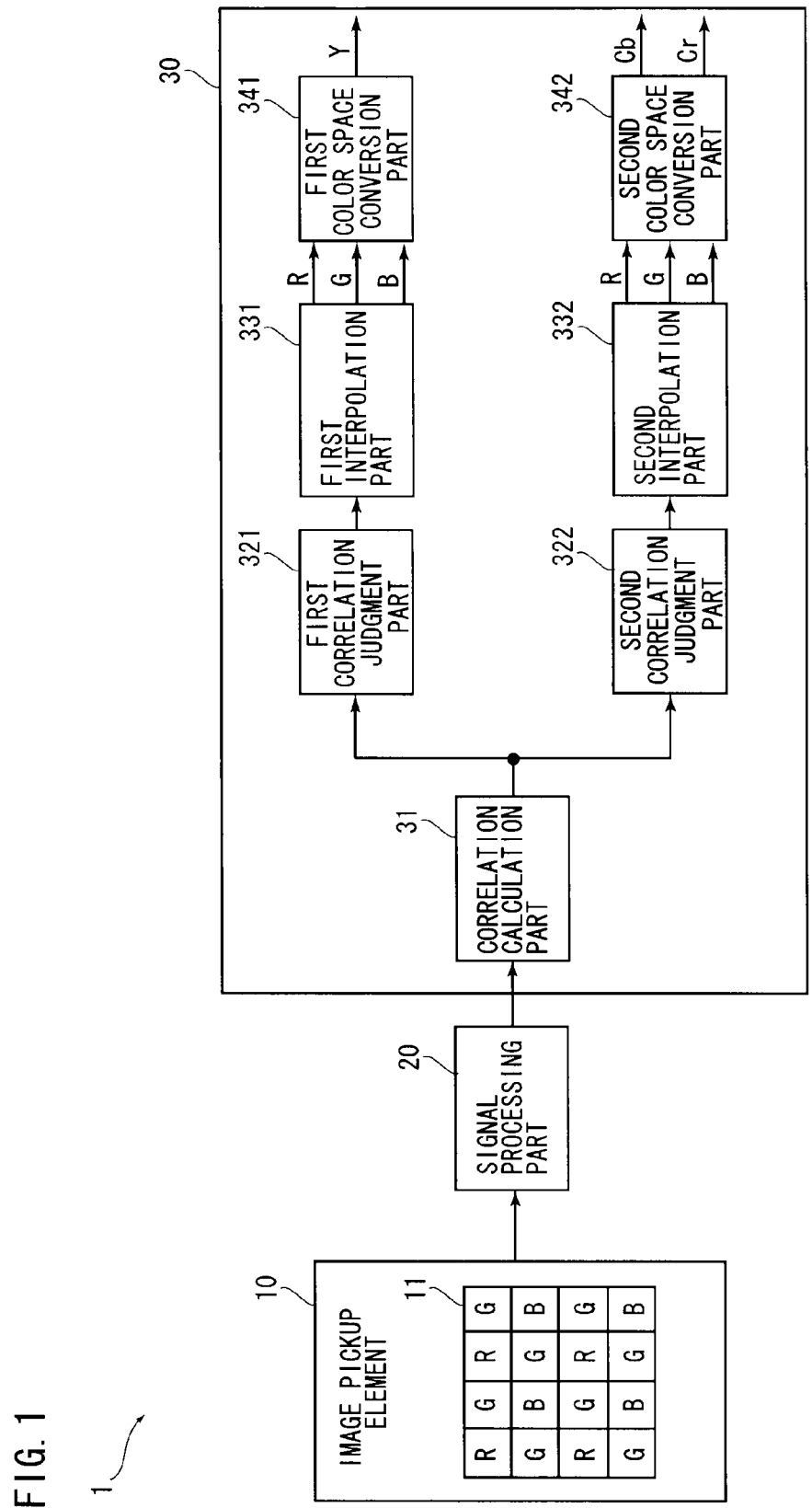
FIG. 1 is a block diagram showing an image pickup apparatus in accordance with preferred embodiments.

Hereinafter, the preferred embodiments of the present invention will be discussed with reference to drawings. FIG. 1 is a block diagram showing an image pickup apparatus 1 in accordance with the preferred embodiments of the present invention. The image pickup apparatus 1 can be applied to, for example, a digital still camera, a digital video camera, an image scanner or the like. The image pickup apparatus 1 comprises an image pickup element 10, a signal processing part 20 and an image processing part 30.

Figure 2:
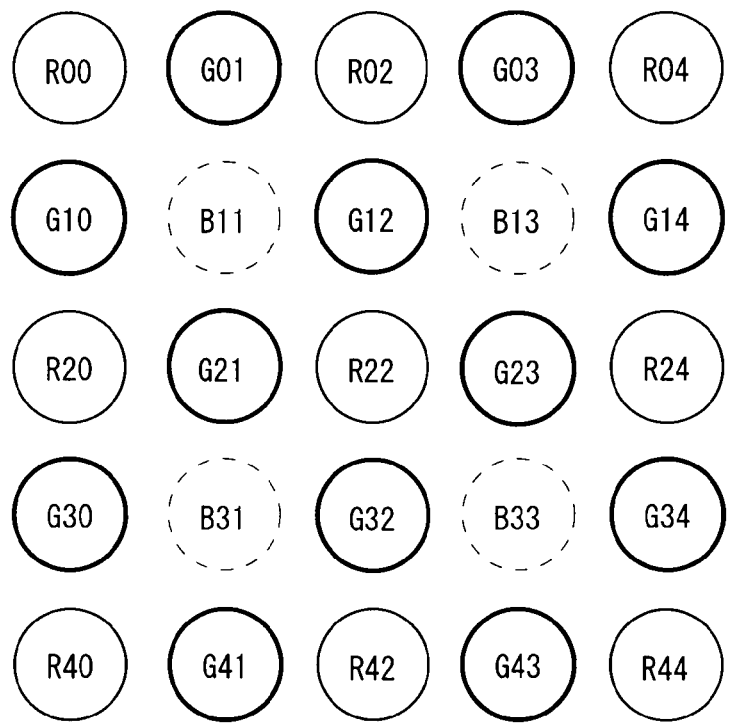
FIG. 2 is a view showing an arrangement of RGB pixel signals outputted from an image pickup element.

The image pickup element 10 is, for example, a CCD image pickup element, a CMOS sensor or the like and comprises a color filter 11 of single-chip Bayer array to support the RGB color space in the first preferred embodiment. Therefore, a pixel signal outputted from the image pickup element 10 is a signal related to any one of color components of R (Red), G (Green) and B (Blue) as shown in FIG. 2. Alternatively, a color filter array for complementary colors (YMCK system) may be used.

In FIG. 2, two numbers follow each of reference signs R (Red), G (Green) and B (Blue) representing the respective color components, and the first number of the two numbers represents a row number of the pixel array and the second number represents a column number of the pixel array. In this exemplary array, pixels of R and G are alternately read out, such as R→G→R→G . . . , in even rows and pixels of G and B are alternately read out, such as G→B→G→B . . . , in odd rows.

In the signal processing part 20, a signal processing (preprocessing) such as white balancing, black level correction or the like is performed on the pixel signal outputted from the image pickup element 10. The pixel signal on which the preprocessing is performed in the signal processing part 20 is transmitted to the image processing part 30.

The image processing part 30 comprises a correlation calculation part 31, a first correlation judgment part 321, a second correlation judgment part 322, a first interpolation part 331, a second interpolation part 332, a first color space conversion part 341 and a second color space conversion part 342. The pixel signal outputted from the signal processing part 20 is inputted to the correlation calculation part 31. The correlation calculation part 31 calculates correlation values with respect to a specified pixel in a plurality of directions. Function blocks included in the signal processing part 20 and the image processing part 30 may be constructed of hardware circuits, or part of or all of the function parts may be implemented by software.

<Method of Calculating Correlation Value of Each Pixel>

Next, discussion will be made on details of a correlation-value calculation process in the correlation calculation part 31. In the first preferred embodiment, the correlation values are calculated in two directions, i.e., a vertical direction and a horizontal direction.

In FIGS. 2, 3A, 3B, 4A and 4B, thick solid circles represent G signals, thin solid circles represent R signals and broken-line circles represent B signals. Further, in these figures, representations such as R00, G01 and the like are used as names for identifying pixels while the same representations in Eqs. 1 to 8 indicate respective pixel values of the pixels.

Figure 3A:
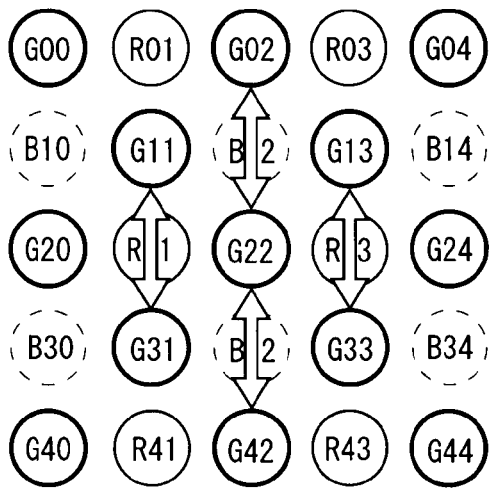
FIGS. 3A and 3B are views showing a method of calculating the correlation values in vertical and horizontal directions in a case where a specified pixel is a G pixel.
Figure 3B:
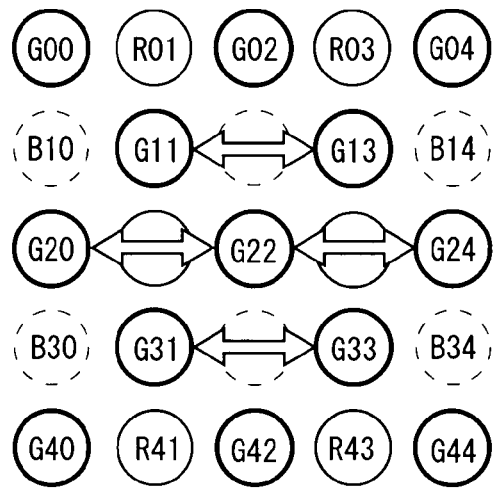

FIGS. 3A and 3B show a method of calculating the correlation values in a case where the specified pixel is a G signal (herein, G22). In the first preferred embodiment, the G signals included in a surrounding area of 5×5 pixels around the specified pixel are used as an object area, but the range of the surrounding area is not particularly limited. Alternatively, a 7×7 area or the like may be used.

FIG. 3A shows a method of calculating the correlation value (Cvertical) in the vertical direction and an equation for the calculation is Eq. 1.

$$Cvertical = \frac{|G11 - G31| + |G02 - G22| + |G22 - G42| + |G13 - G33|}{4} \quad \text{(Eq. 1)}$$

Specifically, by using respective pixel values of the seven G signals (G11, G31, G02, G22, G42, G13 and G33), pixel differential absolute values of four pairs of these G signals in the vertical direction are calculated and an average value of these pixel differential absolute values is obtained as the correlation value (Cvertical). Then, the smaller the correlation value (Cvertical) is, the higher the correlation in the vertical direction becomes.

FIG. 3B shows a method of calculating the correlation value (Chorizontal) in the horizontal direction and an equation for the calculation is Eq. 2.

$$Chorizontal = \frac{|G11 - G13| + |G20 - G22| + |G22 - G24| + |G31 - G33|}{4} \quad \text{(Eq. 2)}$$

Specifically, by using respective pixel values of the seven G signals (G11, G13, G20, G22, G24, G31 and G33), pixel differential absolute values of four pairs of these G signals in the horizontal direction are calculated and an average value of these pixel differential absolute values is obtained as the correlation value (Chorizontal). Then, the smaller the correlation value (Chorizontal) is, the higher the correlation in the horizontal direction becomes.

Figure 4A:
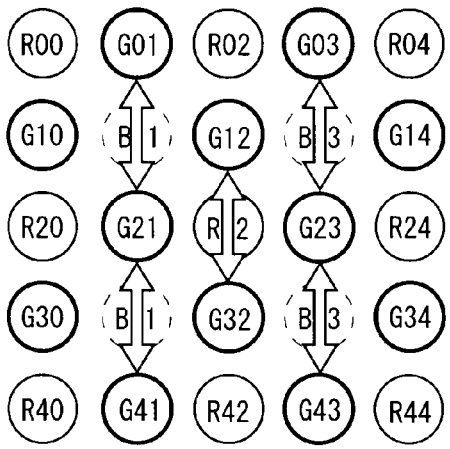
FIGS. 4A and 4B are views showing a method of calculating the correlation values in vertical and horizontal directions in a case where a specified pixel is an R pixel.
Figure 4B:
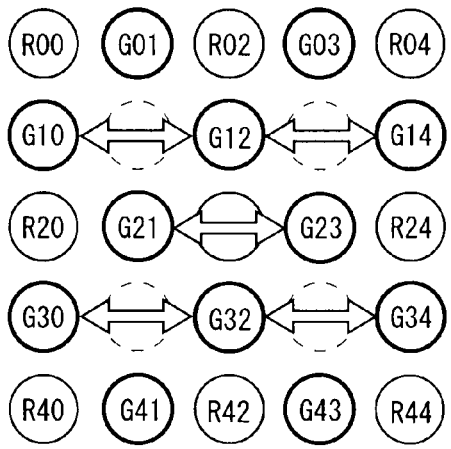

FIGS. 4A and 4B show a method of calculating the correlation values in a case where the specified pixel is an R signal (herein, R22). In the first preferred embodiment, the G signals included in a surrounding area of 5×5 pixels around the specified pixel are used as object pixels, but the range of the surrounding area is not particularly limited. Alternatively, a 3×3 area, a 7×7 area or the like may be used.

FIG. 4A shows a method of calculating the correlation value (Cvertical) in the vertical direction and an equation for the calculation is Eq. 3.

$$C_{vertical} = \frac{|G01 - G21| + |G21 - G41| + |G12 - G32| + |G03 - G23| + |G23 - G43|}{5} \quad \text{(Eq. 3)}$$

Specifically, by using respective pixel values of the eight G signals (G01, G21, G41, G12, G32, G03, G23 and G43), pixel differential absolute values of five pairs of these G signals in the vertical direction are calculated and an average value of these pixel differential absolute values is obtained as the correlation value (Cvertical). Then, the smaller the correlation value (Cvertical) is, the higher the correlation in the vertical direction becomes.

FIG. 4B shows a method of calculating the correlation value (Chorizontal) in the horizontal direction and an equation for the calculation is Eq. 4.

$$C_{horizontal} = \frac{|G10 - G12| + |G12 - G14| + |G21 - G23| + |G30 - G32| + |G32 - G34|}{5} \quad \text{(Eq. 4)}$$

Specifically, by using respective pixel values of the eight G signals (G10, G12, G14, G21, G23, G30, G32 and G34), pixel differential absolute values of five pairs of these G signals in the horizontal direction are calculated and an average value of these pixel differential absolute values is obtained as the correlation value (Chorizontal). Then, the smaller the correlation value (Chorizontal) is, the higher the correlation in the horizontal direction becomes.

A method of calculating the correlation values in a case where the specified pixel is a B signal is the same as that in the case where the specified pixel is an R signal. Specifically, in FIGS. 4A and 4B, by replacing the R signal with a B signal and using Eqs. 3 and 4 in the same manner, it is possible to calculate the correlation values in the vertical and horizontal directions.

<Judgment on Correlation Direction of Each Pixel>

After the correlation values in the two directions, i.e., the vertical and horizontal directions, are calculated by the correlation calculation part 31, the calculation results of correlation values and the pixel signal are outputted to the first correlation judgment part 321 and the second correlation judgment part 322. In other words, the correlation values calculated by the correlation calculation part 31 are outputted to both the first and second correlation judgment parts 321 and 322 and the pixel signal inputted from the signal processing part 20 is also outputted to both the first and second correlation judgment parts 321 and 322. The first correlation judgment part 321 and the second correlation judgment part 322 are processing parts for judging the correlation with respect to the specified pixel on the basis of the calculation results of correlation values. The first correlation judgment part 321 judges the correlation direction while evaluating the correlation with respect to the specified pixel highly. The second correlation judgment part 322 judges the correlation direction while evaluating the correlation with respect to the specified pixel low, as compared with the first correlation judgment part 321.

Figure 5:
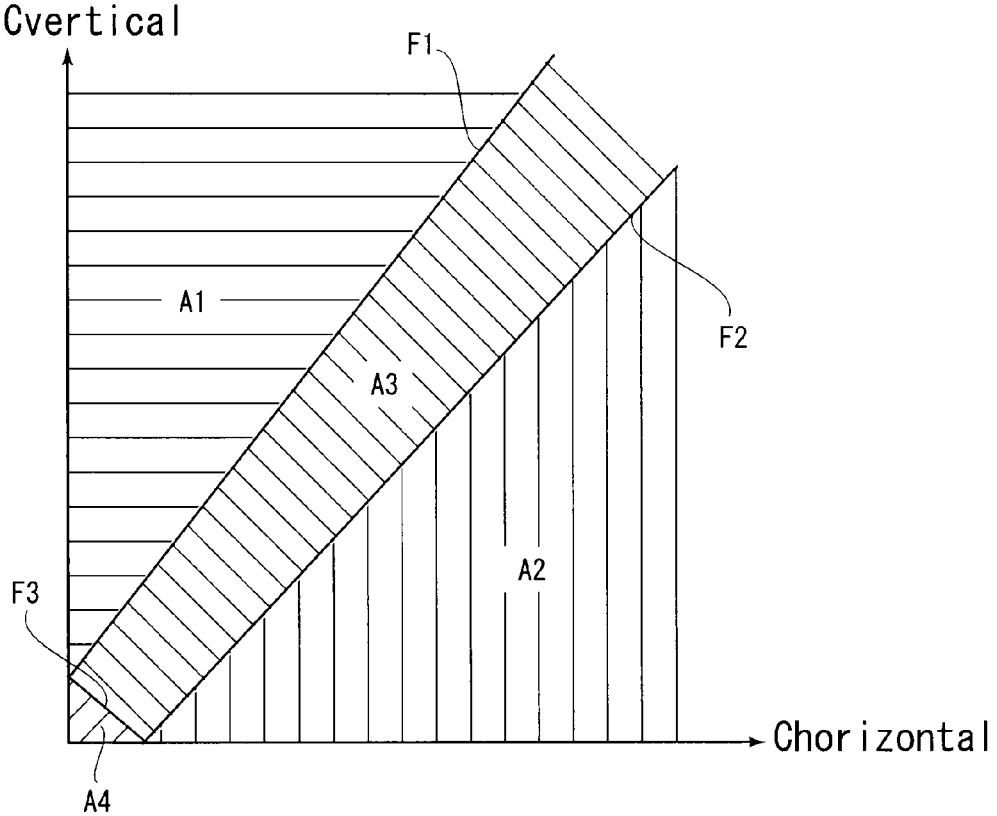
FIG. 5 is a graph showing a correspondence where the correlation is evaluated highly.

FIG. 5 is a graph showing a correspondence of the correlation values used for judgment on the correlation direction in the first correlation judgment part 321. The vertical axis represents the correlation value (Cvertical) calculated by using Eq. 1 or 3 and the horizontal axis represents the correlation value (Chorizontal) calculated by using Eq. 2 or 4.

When the relation between the correlation value (Cvertical) and the correlation value (Chorizontal) is found in the area A1, the first correlation judgment part 321 judges that the correlation direction of the specified pixel is the horizontal direction. When the relation between the correlation value (Cvertical) and the correlation value (Chorizontal) is found in the area A2, the first correlation judgment part 321 judges that the correlation direction of the specified pixel is the vertical direction. When the relation between the correlation value (Cvertical) and the correlation value (Chorizontal) is found in the area A3, the first correlation judgment part 321 judges that there is no correlation of the specified pixel in any direction. When the relation between the correlation value (Cvertical) and the correlation value (Chorizontal) is found in the area A4, the first correlation judgment part 321 judges that the correlation of the specified pixel is high in both the vertical and horizontal directions.

Figure 6:
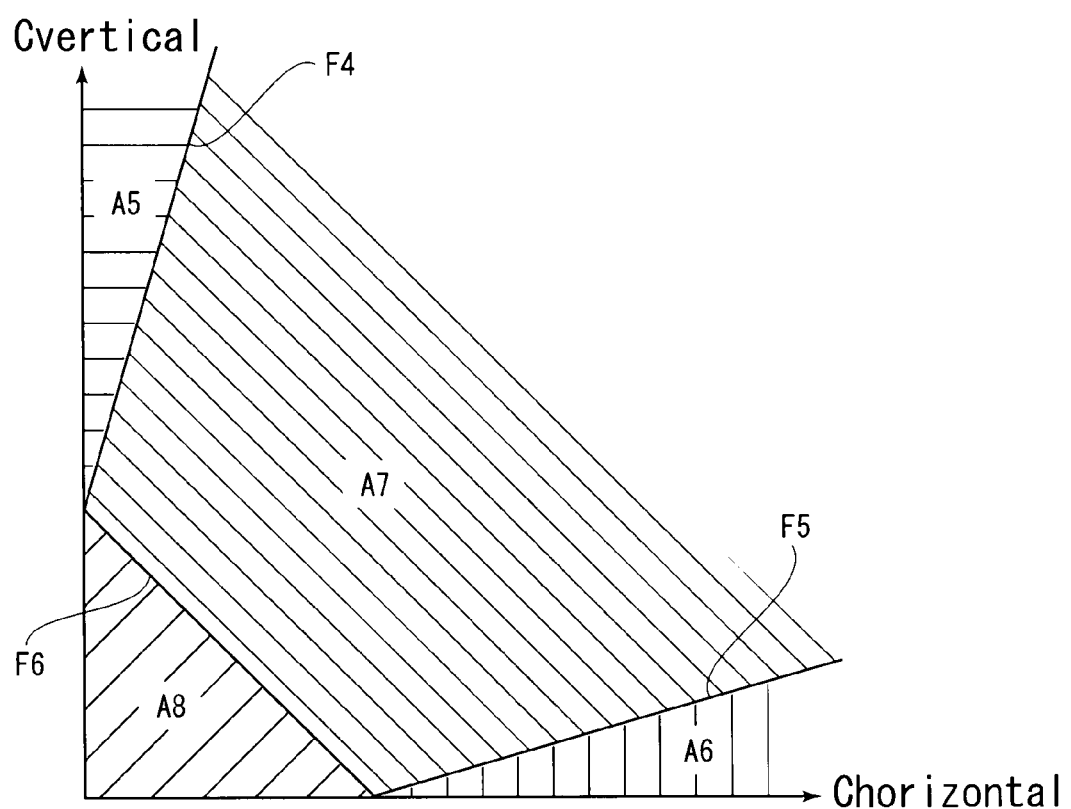
FIG. 6 is a graph showing a correspondence where the correlation is evaluated low.

On the other hand, FIG. 6 is a graph showing a correspondence of the correlation values used for judgment on the correlation direction in the second correlation judgment part 322. The vertical axis represents the correlation value (Cvertical) calculated by using Eq. 1 or 3 and the horizontal axis represents the correlation value (Chorizontal) calculated by using Eq. 2 or 4.

When the relation between the correlation value (Cvertical) and the correlation value (Chorizontal) is found in an area A5, the second correlation judgment part 322 judges that the correlation direction of the specified pixel is the horizontal direction. When the relation between the correlation value (Cvertical) and the correlation value (Chorizontal) is found in an area A6, the second correlation judgment part 322 judges that the correlation direction of the specified pixel is the vertical direction. When the relation between the correlation value (Cvertical) and the correlation value (Chorizontal) is found in an area A7, the second correlation judgment part 322 judges that there is no correlation of the specified pixel in any direction. When the relation between the correlation value (Cvertical) and the correlation value (Chorizontal) is found in an area A8, the second correlation judgment part 322 judges that the correlation of the specified pixel is high in both the vertical and horizontal directions.

Thus, the first correlation judgment part 321 and the second correlation judgment part 322 determine the correlation direction by using the correspondence of correlation values shown in FIGS. 5 and 6, respectively. As a result, the first correlation judgment part 321 judges the correlation direction while evaluating the correlation between the specified pixel and the surrounding pixels highly. On the other hand, the second correlation judgment part 322 judges the correlation direction while evaluating the correlation between the specified pixel and the surrounding pixels low, as compared with the first correlation judgment part 321.

Both the area A1 in FIG. 5 and the area A5 in FIG. 6 are areas where the correlation is judged to be high in the horizontal direction. As can be seen from the comparison between FIGS. 5 and 6, the inclination of the line F4 defining the area A5 is larger than that of the line F1 defining the area A1. Further, the value of intersection point between the line F4 and the vertical axis is larger than that between the line F1 and the vertical axis. In other words, when there is a relation that the correlation value (Chorizontal) is slightly smaller than the correlation value (Cvertical), the first correlation judgment part 321 actively adopts the relation to judge that the correlation in the horizontal direction is high. On the other hand, when there is a relation that the correlation value (Chorizontal) is sufficiently smaller than the correlation value (Cvertical), the second correlation judgment part 322 judges that the correlation in the horizontal direction is high.

Further, the inclination of the line F5 defining the area A6 is smaller than that of the line F2 defining the area A2. Furthermore, the value of intersection point between the line F5 and the horizontal axis is larger than that between the line F2 and the horizontal axis. In other words, when there is a relation that the correlation value (Cvertical) is slightly smaller than the correlation value (Chorizontal), the first correlation judgment part 321 actively adopts the relation to judge that the correlation in the vertical direction is high. On the other hand, when there is a relation that the correlation value (Cvertical) is sufficiently smaller than the correlation value (Chorizontal), the second correlation judgment part 322 judges that the correlation in the vertical direction is high.

As to the line F3 defining the areas A3 and A4 and the line F6 defining the areas A7 and A8, the relation shown in FIGS. 5 and 6 is only one example. In other words, though the values of intersection points between the line F6 and the axes are larger those between the line F3 and the axes, the relation between them is not limited to such a relation as above.

<Interpolation Process>

After judging the correlation direction with respect to the specified pixel, the first correlation judgment part 321 outputs the judgment result and the pixel signal to the first interpolation part 331. After judging the correlation direction with respect to the specified pixel, the second correlation judgment part 322 outputs the judgment result and the pixel signal to the second interpolation part 332.

Then, the first interpolation part 331 performs an interpolation process on the basis of the judgment result on the correlation direction inputted from the first correlation judgment part 321. For example, when the judgment result that the correlation in the vertical direction is high is received, a pixel of color component which is absent in the specified pixel is interpolated by using the pixel of the same color in the vertical direction. Similarly, when the judgment result that the correlation in the horizontal direction is high is received, a pixel of color component which is absent in the specified pixel is interpolated by using the pixel of the same color in the horizontal direction. Further, when the judgment result that there is no correlation in any direction is received, for example, median interpolation is performed. Specifically, a median value of the surrounding pixels around the specified pixel is adopted as an interpolation value. Furthermore, when the judgment result that the correlation is high in both the vertical and horizontal directions is received, for example, mean value interpolation is performed. Specifically, an average pixel value of the surrounding pixels around the specified pixel is adopted as an interpolation value.

The second interpolation part 332 performs interpolation in the same manner as above. Specifically, the second interpolation part 332 performs an interpolation process on the basis of the judgment result on the correlation direction inputted from the second correlation judgment part 322. For example, when the judgment result that the correlation in the vertical direction is high is received, a pixel of color component which is absent in the specified pixel is interpolated by using the pixel of the same color in the vertical direction. In the other cases, interpolation is performed in the same manner as above.

Thus, the first interpolation part 331 evaluates the correlation highly and actively uses the pixels in the correlation direction to perform the interpolation in accordance with the judgment result of the first correlation judgment part 321. On the other hand, the second interpolation part 332 evaluates the correlation relatively low to perform the interpolation in accordance with the judgment result of the second correlation judgment part 322. In other words, the second interpolation part 332 is an interpolation part which actively adopts the median interpolation or the mean value interpolation.

Further, in the case where the specified pixel is interpolated by using a pixel in the vertical or horizontal direction, if the pixel of color component for the interpolation is present on the line in the vertical or horizontal direction, by using the pixel value on the line to calculate the average value or perform linear interpolation, the pixel interpolation process can be performed. Depending on the pixel array, however, there is sometimes a case where no pixel of color component for the interpolation on the line in the direction to be used for the interpolation. In such a case, a method in which a pixel value of the pixel for the interpolation is estimated from the rate of pixel change (Laplacian) in a direction orthogonal to the direction to be used for the interpolation may be used.

<Color Space Conversion Process>

After performing the pixel interpolation process on each pixel, the first interpolation part 331 outputs a complete pixel signal after being interpolated to the first color space conversion part 341. In other words, the signal inputted to the first color space conversion part 341 includes signals for all the RGB color components per pixel. Further, after performing the pixel interpolation process on each pixel, the second interpolation part 332 outputs a complete pixel signal after being interpolated to the second color space conversion part 342. In other words, the signal inputted to the second color space conversion part 342 includes signals for all the RGB color components per pixel.

Then, the first color space conversion part 341 generates a luminance signal (Y signal) from the pixel signal of RGB for each pixel. On the other hand, the second color space conversion part 342 generates color difference signals (Cb and Cr signals) from the pixel signal of RGM for each pixel. Thus, the RGB signal of Bayer array outputted from the image pickup element 10 is converted into the luminance signal (Y signal) and the color difference signals (Cb and Cr signals).

As discussed above, the luminance signal outputted from the first color space conversion part 341 is a signal generated from the RGB signal which is interpolated by the first interpolation part 331. The RGB signal interpolated by the first interpolation part 331 is a signal which is subjected to the pixel interpolation with the correlation evaluated highly, i.e., a signal maintaining high resolution. It is thereby possible to keep the sense of resolution of the generated YUV signal high.

On the other hand, the color difference signals outputted from the second color space conversion part 342 are signals generated from the RGB signal which is interpolated by the second interpolation part 332. The RGB signal interpolated by the second interpolation part 332 is a signal which is subjected to the pixel interpolation with the correlation evaluated relatively low, i.e., a signal whose noise is suppressed. In other words, this is a signal to which an LPF (Low Pass Filter) is applied. It is thereby possible to suppress the noise of the generated YUV signal even if a RAW image having high noise is outputted from the image pickup element 10.

Thus, the image pickup apparatus 1 of the first preferred embodiment can obtain a pixel signal maintaining the sense of resolution with noise suppressed. Especially, from an image having high photographic sensitivity and high noise, it is possible to obtain a beautiful image maintaining the sense of resolution with low noise.

After that, the luminance signal (Y signal) outputted from the first color space conversion part 341 and the color difference signals (Cb and Cr signals) outputted from the second color space conversion part 342 are subjected to various image processings in not-shown processing parts and stored into a memory. Alternatively, the signals are displayed on a liquid crystal monitor or the like.

The Second Preferred Embodiment

Figure 7:
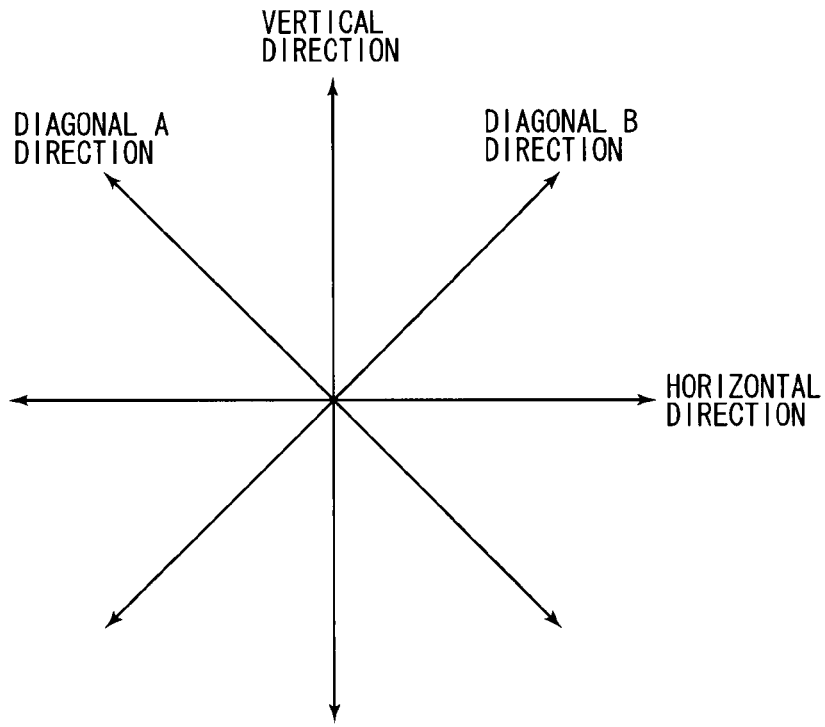
FIG. 7 is a view showing four directions in which correlation values are calculated.

Next, the second preferred embodiment of the present invention will be discussed. Also in the image pickup apparatus 1 of the second preferred embodiment, the processing flow is the same as that of the first preferred embodiment. The second preferred embodiment, however, is different from the first preferred embodiment in the number of directions of correlation to be considered. In the second preferred embodiment, as shown in FIG. 7, the correlation is considered in four directions, i.e., the vertical direction, the horizontal direction, a diagonal A direction and a diagonal B direction. As shown in FIG. 7, the diagonal A direction refers to a direction having the inclination of 45 degrees counterclockwisely with respect to the vertical direction, and the diagonal B direction refers to a direction having the inclination of 45 degrees clockwisely with respect to the vertical direction.

The correlation calculation part 31 calculates correlation values in the diagonal directions as discussed below, as well as the correlation values in the vertical direction and the horizontal direction discussed above with reference to FIGS. 3A, 3B, 4A and 4B and Eqs. 1 to 4.

Figure 8A:
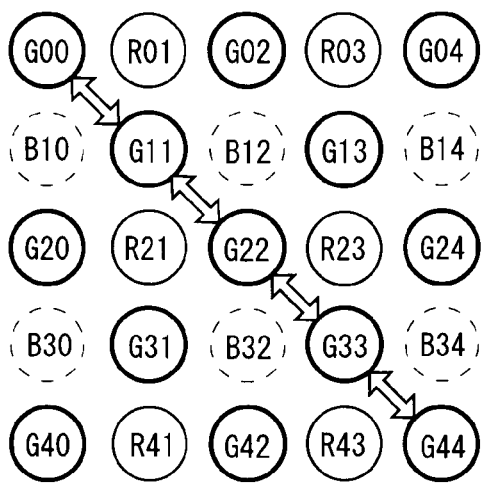
FIGS. 8A and 8B are views showing a method of calculating the correlation values in diagonal directions in a case where a specified pixel is the G pixel.
Figure 8B:
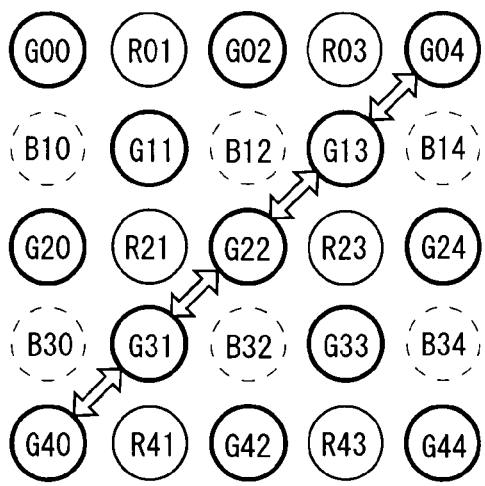

FIGS. 8A and 8B are views showing a method of calculating the correlation values in a case where the specified pixel is a G signal (herein, G22). In the second preferred embodiment, the G signals included in a surrounding area of 5×5 pixels around the specified pixel are used as an object area, but the range of the surrounding area is not particularly limited. Alternatively, a 7×7 area or the like may be used.

FIG. 8A shows a method of calculating the correlation value (CdiagonalA) in the diagonal A direction and an equation for the calculation is Eq. 5.

$$CdiagonalA = \frac{|G00 - G11| + |G11 - G22| + |G22 - G33| + |G33 - G44|}{4} \quad (\text{Eq. 5})$$

Specifically, by using respective pixel values of the five G signals (G00, G11, G22, G33 and G44), pixel differential absolute values of four pairs of these G signals in the diagonal A direction are calculated and an average value of these pixel differential absolute values is obtained as the correlation value (CdiagonalA). Then, the smaller the correlation value (CdiagonalA) is, the higher the correlation in the diagonal A direction becomes.

FIG. 8B shows a method of calculating the correlation value (CdiagonalB) in the diagonal B direction and an equation for the calculation is Eq. 6.

$$CdiagonalB = \frac{|G04 - G13| + |G13 - G22| + |G22 - G31| + |G31 - G40|}{4} \quad (\text{Eq. 6})$$

Specifically, by using respective pixel values of the five G signals (G04, G13, G22, G31 and G40), pixel differential absolute values of four pairs of these G signals in the diagonal B direction are calculated and an average value of these pixel differential absolute values is obtained as the correlation value (CdiagonalB). Then, the smaller the correlation value (CdiagonalB) is, the higher the correlation in the diagonal B direction becomes.

Figure 9A:
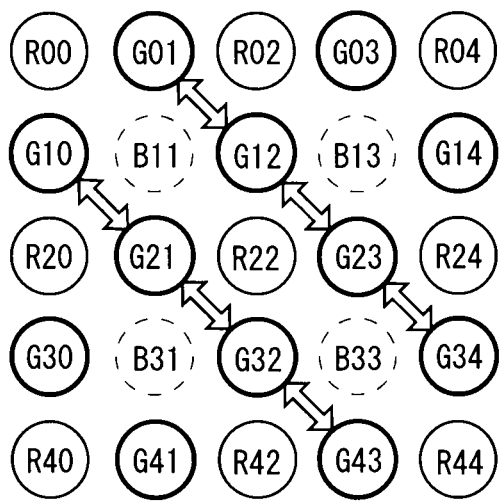
FIGS. 9A and 9B are views showing a method of calculating the correlation values in diagonal directions in a case where a specified pixel is the R pixel.
Figure 9B:
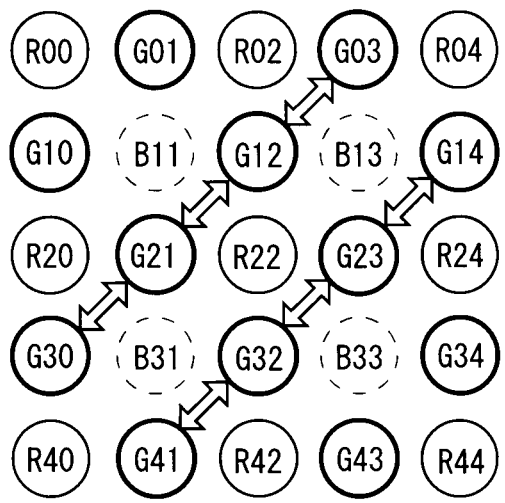

FIGS. 9A and 9B show a method of calculating the correlation values in a case where the specified pixel is an R signal (herein, R22). In the second preferred embodiment, the G signals included in a surrounding area of 5×5 pixels around the specified pixel are used as object pixels, but the range of the surrounding area is not particularly limited. Alternatively, a 3×3 area, a 7×7 area or the like may be used.

FIG. 9A shows a method of calculating the correlation value (CdiagonalA) in the diagonal A direction and an equation for the calculation is Eq. 7.

$$CdiagonalA = \frac{|G10 - G21| + |G21 - G32| + |G32 - G43| + |G01 - G12| + |G12 - G23| + |G23 - G24|}{6} \quad (\text{Eq. 7})$$

Specifically, by using respective pixel values of the eight G signals (G0, G21, G32, G43, G01, G12, G23 and G34), pixel differential absolute values of six pairs of these G signals in the diagonal A direction are calculated and an average value of these pixel differential absolute values is obtained as the correlation value (CdiagonalA). Then, the smaller the correlation value (CdiagonalA) is, the higher the correlation in the diagonal A direction becomes.

FIG. 9B shows a method of calculating the correlation value (CdiagonalB) in the diagonal B direction and an equation for the calculation is Eq. 8.

$$CdiagonalB = \frac{|G03 - G12| + |G12 - G21| + |G21 - G30| + |G14 - G23| + |G23 - G32| + |G32 - G41|}{6} \quad (\text{Eq. 8})$$

Specifically, by using respective pixel values of the eight G signals (G03, G12, G21, G30, G14, G23, G32 and G41), pixel differential absolute values of six pairs of these G signals in the diagonal B direction are calculated and an average value of these pixel differential absolute values is obtained as the correlation value (CdiagonalB). Then, the smaller the correlation value (CdiagonalB) is, the higher the correlation in the diagonal B direction becomes.

A method of calculating the correlation values in a case where the specified pixel is a B signal is the same as that in the case where the specified pixel is an R signal. Specifically, in FIGS. 9A and 9B, by replacing the R signal with a B signal and using Eqs. 7 and 8 in the same manner, it is possible to calculate the correlation values in the diagonal A direction and the diagonal B direction.

In the second preferred embodiment, the first correlation judgment part 321 and the second correlation judgment part 322 input the correlation values in the four directions, i.e., the vertical direction, the horizontal direction, the diagonal A direction and the diagonal B direction, which are calculated by the correlation calculation part 31.

Figure 10:
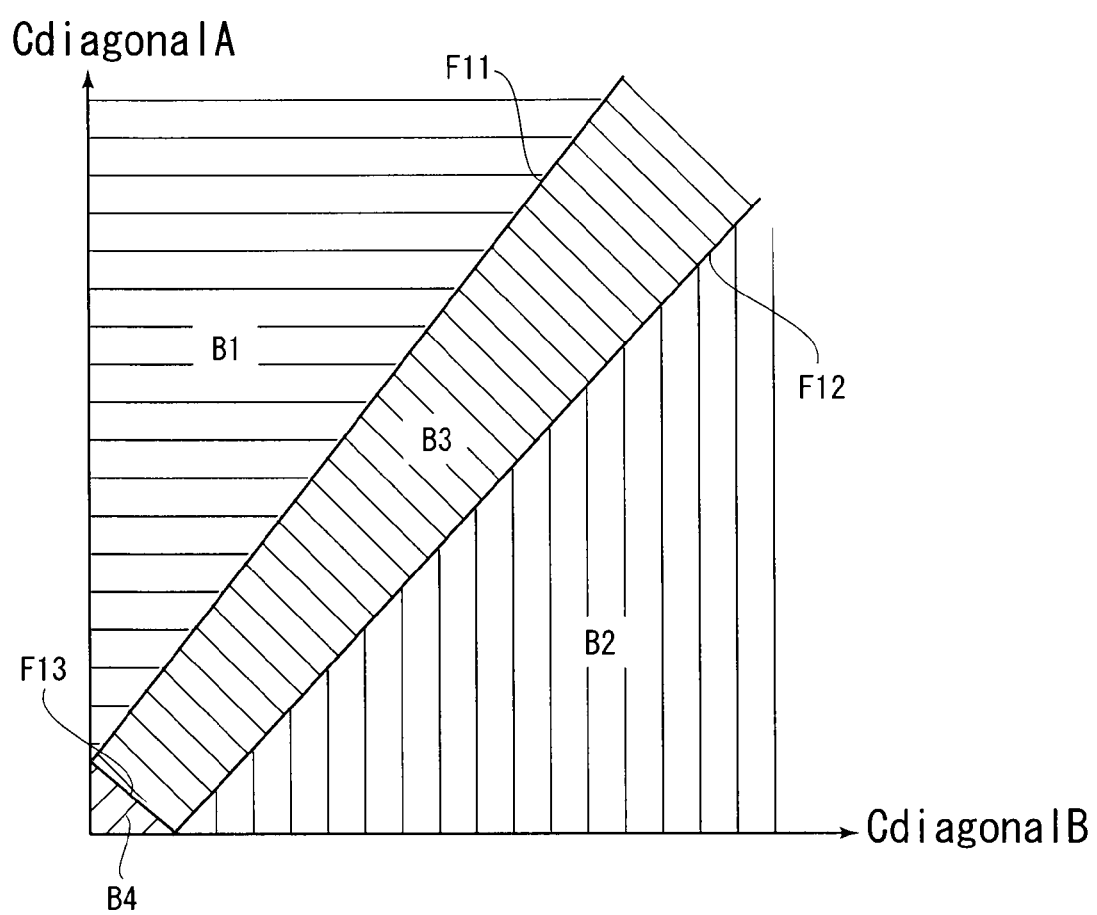
FIG. 10 is a graph showing a correspondence where the correlation is evaluated highly.

In the second preferred embodiment, the first correlation judgment part 321 uses the correspondence shown in FIG. 10 together with the correspondence shown in FIG. 5. FIG. 10 is a graph showing a correspondence between the correlation values (CdiagonalA and CdiagonalB) and the correlation direction. In FIG. 10, the vertical axis represents the correlation value (CdiagonalA) and the horizontal axis represents the correlation value (CdiagonalB). The area B1 is an area for judgment that the correlation direction is the diagonal B direction, and the area B2 is an area for judgment that the correlation direction is the diagonal A direction. Further, the area B3 is an area for judgment that there is no correlation in any direction, and the area B4 is an area for judgment that the correlation is high in both the diagonal A direction and the diagonal B direction.

Figure 11:
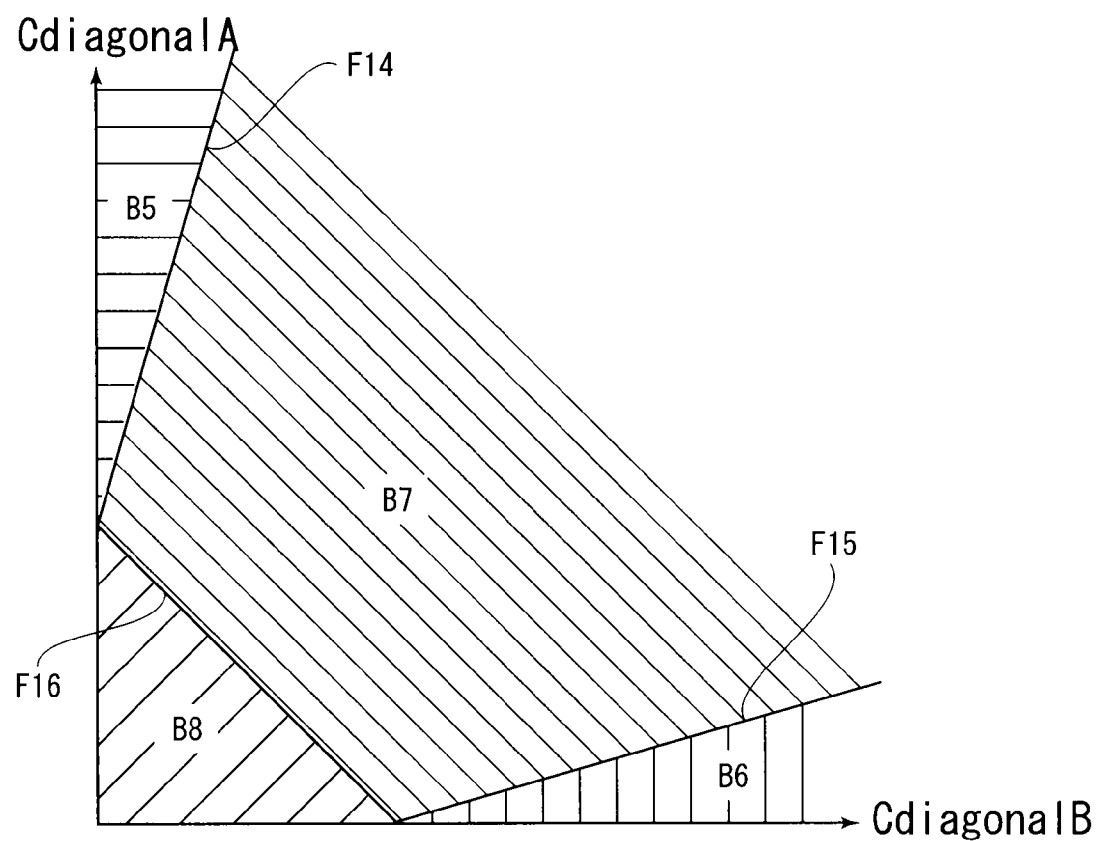
FIG. 11 is a graph showing a correspondence where the correlation is evaluated low.

The second correlation judgment part 322 uses the correspondence shown in FIG. 11 together with the correspondence shown in FIG. 6. FIG. 11 is a graph showing a correspondence between the correlation values (CdiagonalA and CdiagonalB) and the correlation direction. In FIG. 11, the vertical axis represents the correlation value (CdiagonalA) and the horizontal axis represents the correlation value (CdiagonalB). The area B5 is an area for judgment that the correlation direction is the diagonal B direction, and the area B6 is an area for judgment that the correlation direction is the diagonal A direction. Further, the area B7 is an area for judgment that there is no correlation in any direction, and the area B8 is an area for judgment that the correlation is high in both the diagonal A direction and the diagonal B direction.

The relation between the correspondence shown in FIG. 10 and the correspondence shown in FIG. 11 is the same as that between those shown in FIGS. 5 and 6. By using the correspondence shown in FIG. 10, the first correlation judgment part 321 actively adopts the correlation with respect to the specified pixel, to determine the correlation direction. On the other hand, the second correlation judgment part 322 evaluates the correlation low, as compared with the first correlation judgment part 321, to determine the correlation direction.

First, the first correlation judgment part 321 compares the four correlation values (Cvertical, Chorizontal, CdiagonalA, CdiagonalB). When the correlation value (Cvertical) or the correlation value (Chorizontal) is smallest, the first correlation judgment part 321 uses the correspondence of FIG. 5. Then, the first correlation judgment part 321 determines the correlation direction, depending on which of the areas A1 to A4 where the correspondence of the correlation values is found. On the other hand, when the correlation value (CdiagonalA) or the correlation value (CdiagonalB) is smallest, the first correlation judgment part 321 uses the correspondence of FIG. 10. Then, the first correlation judgment part 321 determines the correlation direction, depending on which of the areas B1 to B4 where the correspondence of the correlation values is found.

After the correlation direction is determined, the first interpolation part 331 performs the pixel interpolation process using the pixels in the correlation direction. Specifically, when the correspondence of the correlation values is found in the area A1, the pixel interpolation is performed by using the pixels in the horizontal direction. When the correspondence of the correlation values is found in the area A2, the pixel interpolation is performed by using the pixels in the vertical direction. When the correspondence of the correlation values is found in the area B1, the pixel interpolation is performed by using the pixels in the diagonal B direction. When the correspondence of the correlation values is found in the area B2, the pixel interpolation is performed by using the pixels in the diagonal A direction. Further, when the correspondence of the correlation values is found in the area A3 or B3, for example, the median interpolation is performed. When the correspondence of the correlation values is found in the area A4 or B4, the mean value interpolation is performed.

Similarly, the second correlation judgment part 322 compares the four correlation values (Cvertical, Chorizontal, CdiagonalA, CdiagonalB). When the correlation value (Cvertical) or the correlation value (Chorizontal) is smallest, the second correlation judgment part 322 uses the correspondence of FIG. 6. Then, the second correlation judgment part 322 determines the correlation direction, depending on which of the areas A5 to A8 where the correspondence of the correlation values is found. On the other hand, when the correlation value (CdiagonalA) or the correlation value (CdiagonalB) is smallest, the second correlation judgment part 322 uses the correspondence of FIG. 11. Then, the second correlation judgment part 322 determines the correlation direction, depending on which of the areas B5 to B8 where the correspondence of the correlation values is found.

After the correlation direction is determined, the second interpolation part 332 performs the pixel interpolation process using the pixels in the correlation direction. Specifically, when the correspondence of the correlation values is found in the area A5, the pixel interpolation is performed by using the pixels in the horizontal direction. When the correspondence of the correlation values is found in the area A6, the pixel interpolation is performed by using the pixels in the vertical direction. When the correspondence of the correlation values is found in the area B5, the pixel interpolation is performed by using the pixels in the diagonal B direction. When the correspondence of the correlation values is found in the area B6, the pixel interpolation is performed by using the pixels in the diagonal A direction. Further, when the correspondence of the correlation values is found in the area A7 or B7, for example, the median interpolation is performed. When the correspondence of the correlation values is found in the area A8 or B8, the mean value interpolation is performed.

The following operation is the same as that in the first preferred embodiment. The first color space conversion part 341 generates the luminance signal (Y signal) from the pixel signal of RGB for each pixel. On the other hand, the second color space conversion part 342 generates color difference signals (Cb and Cr signals) from the pixel signal of RGM for each pixel.

Like in the first preferred embodiment, the luminance signal outputted from the first color space conversion part 341 is a signal generated from the RGB signal which is interpolated by the first interpolation part 331, which can keep the sense of resolution of the generated YUV signal high. On the other hand, the color difference signals outputted from the second color space conversion part 342 are signals generated from the RGB signal which is interpolated by the second interpolation part 332, which can suppress the noise of the generated YUV signal. Thus, the image pickup apparatus 1 of the second preferred embodiment can obtain a pixel signal maintaining the sense of resolution with noise suppressed.

The Third Preferred Embodiment

In the above-discussed first and second preferred embodiments, the correlation is evaluated with reference to FIG. 5, 6, 10 or 11. Then, the correspondence shown in FIG. 5, 6, 10 or 11 is one example, and the characteristics of the correspondence can be freely set. As a reference characterizing the correspondence, the level of photographic sensitivity (high or low) can be used.

Figure 12:
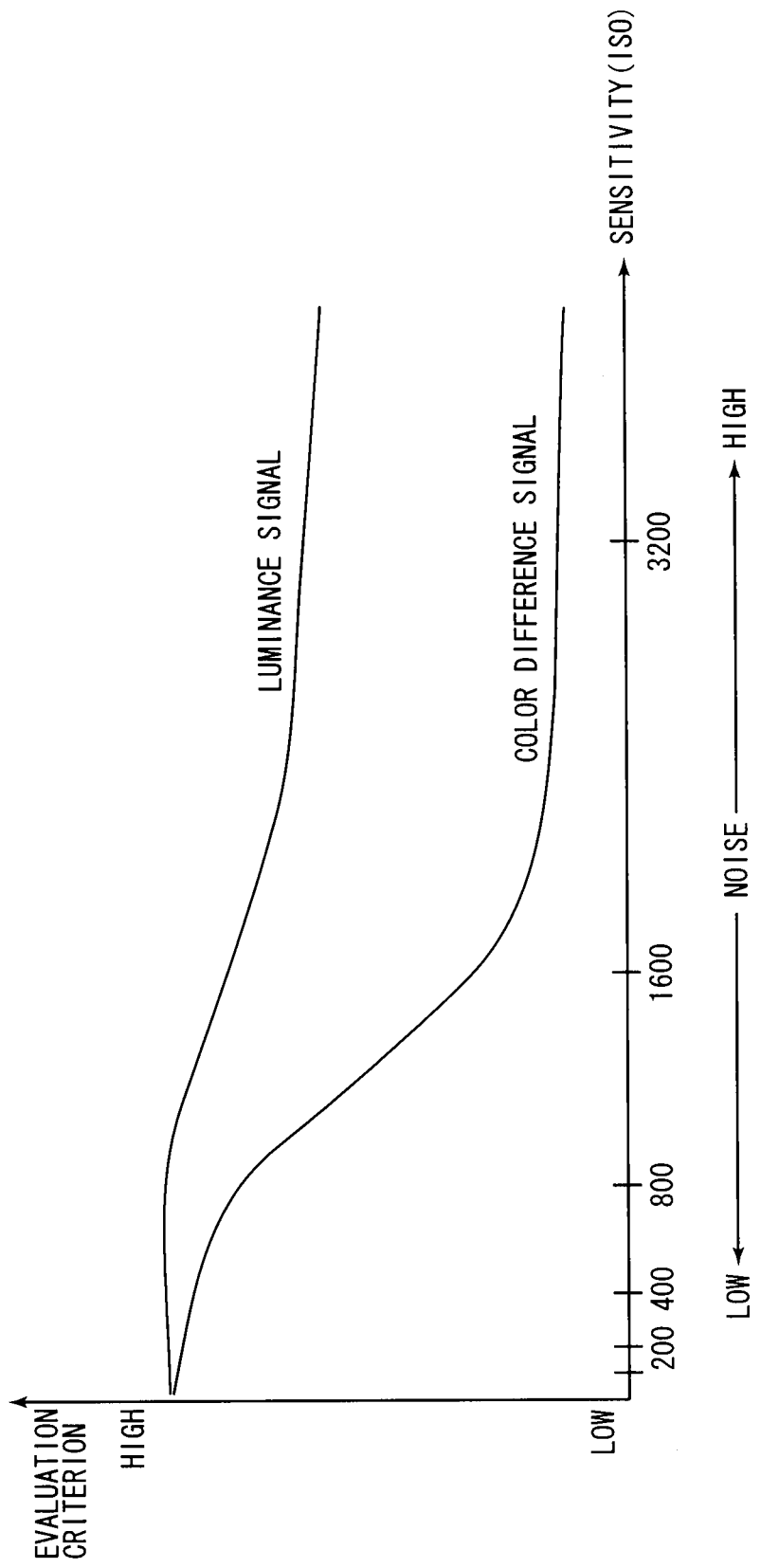
FIG. 12 is a graph showing a relation between the photographic sensitivity and the degree of evaluation.

FIG. 12 is a graph showing a relation between the photographic sensitivity and the level of evaluation criterion. As shown in FIG. 12, as the photographic sensitivity becomes higher, the degree of evaluation on the correlation becomes lower on both the luminance signal and the color difference signal.

For example, in a case of high photographic sensitivity, in order to make the color difference signal smoother, the second correlation judgment part 322 makes judgment with less consideration of the correlation. Specifically, in FIG. 6, the inclination of the line F4 is made larger, the inclination of the line F5 is made smaller and the values of intersection points between the line F6 and the vertical axis and the horizontal axis (y intercept, x intercept) are made larger. Further, since there occurs noise in the luminance signal, the first correlation judgment part 321 makes judgment with less consideration of the correlation. Specifically, in FIG. 5, the inclination of the line F1 is made larger, the inclination of the line F2 is made smaller and the values of intersection points between the line F3 and the vertical axis and the horizontal axis (y intercept, x intercept) are made larger. This makes it possible to reduce the noise in the luminance signal though there arises degradation in the sense of resolution to a certain degree.

Thus, since the degree of evaluation on the correlation is determined depending on the level of photographic sensitivity, it is possible to perform an optimal interpolation process in accordance with the degree of noise occurring therein.

The Fourth Preferred Embodiment

In the above-discussed first and second preferred embodiments, the first color space conversion part 341 outputs the luminance signal and the second color space conversion part 342 outputs the color difference signals. In contrast, in the fourth preferred embodiment, the luminance signal and the color difference signals are generated by using the outputs from both the first and second color space conversion parts 341 and 342.

Figure 13:
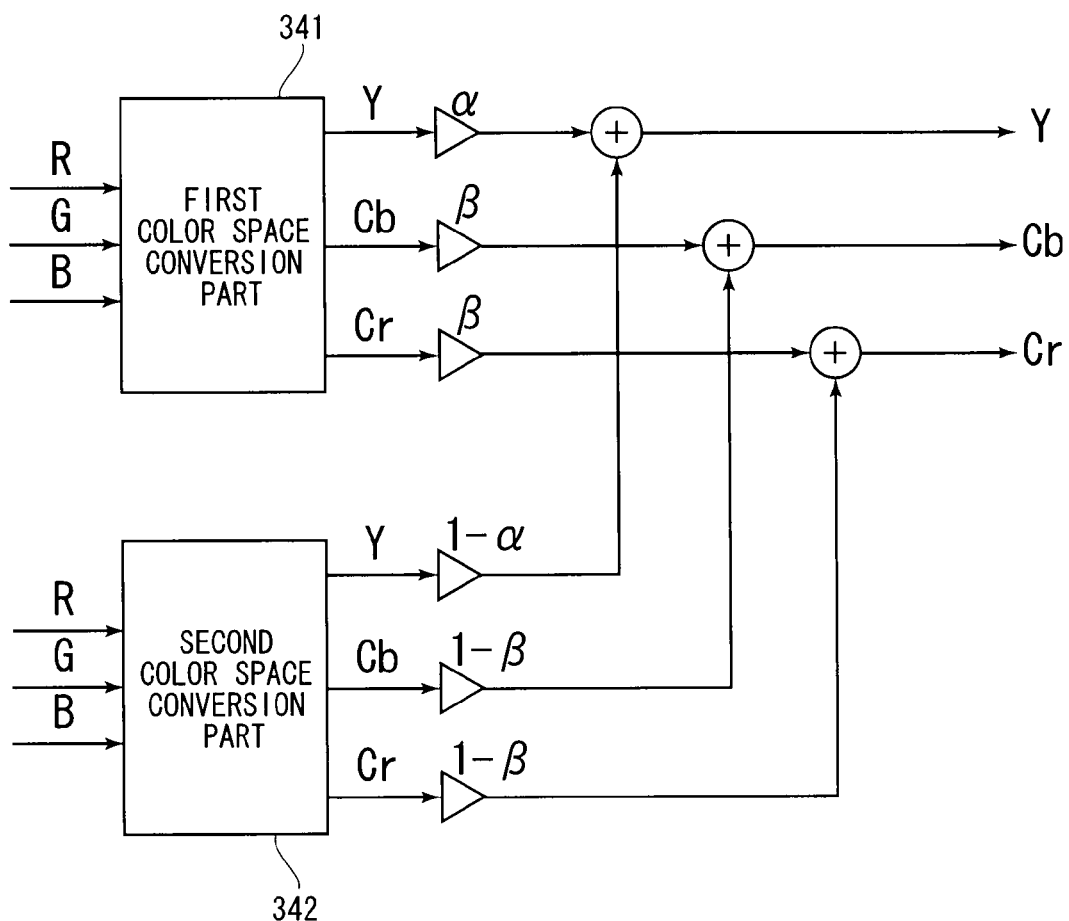
FIG. 13 is a block diagram of a preferred embodiment for performing weighting addition of pixel signals after color space conversion.

FIG. 13 is a block diagram showing part of the image pickup apparatus 1 in accordance with the fourth preferred embodiment. The constitution on the upstream side from the first color space conversion part 341 and the second color space conversion part 342 is the same as that of FIG. 1. In the fourth preferred embodiment, the first color space conversion part 341 generates the Y signal, the Cb signal and the Cr signal from the complete RGB signal outputted from the first interpolation part 331. Similarly, the second color space conversion part 342 generates the Y signal, the Cb signal and the Cr signal from the complete RGB signal outputted from the second interpolation part 332.

Then, the Y signal outputted from the first color space conversion part 341 is multiplied by the weighting factor α and the Cb signal and the Cr signal outputted therefrom is multiplied by the weighting factor β. The factors α and β are each a number not less than 0 and not more than 1. The Y signal outputted from the second color space conversion part 342 is multiplied by the weighting factor (1−α) and the Cb signal and the Cr signal outputted therefrom is multiplied by the weighting factor (1−β).

Further, by performing additions of the Y signals, the Cb signals and the Cr signals multiplied by the respective weighting factors as shown in FIG. 13, final Y signal, Cb signal and Cr signal are outputted. Specifically, in order to generate a signal with the correlation evaluated highly, the values of the factors α and β should be made larger. Then, also in the four preferred embodiment, the values of the weighting factors α and β are determined with the photographic sensitivity used as a reference.

Figure 14:
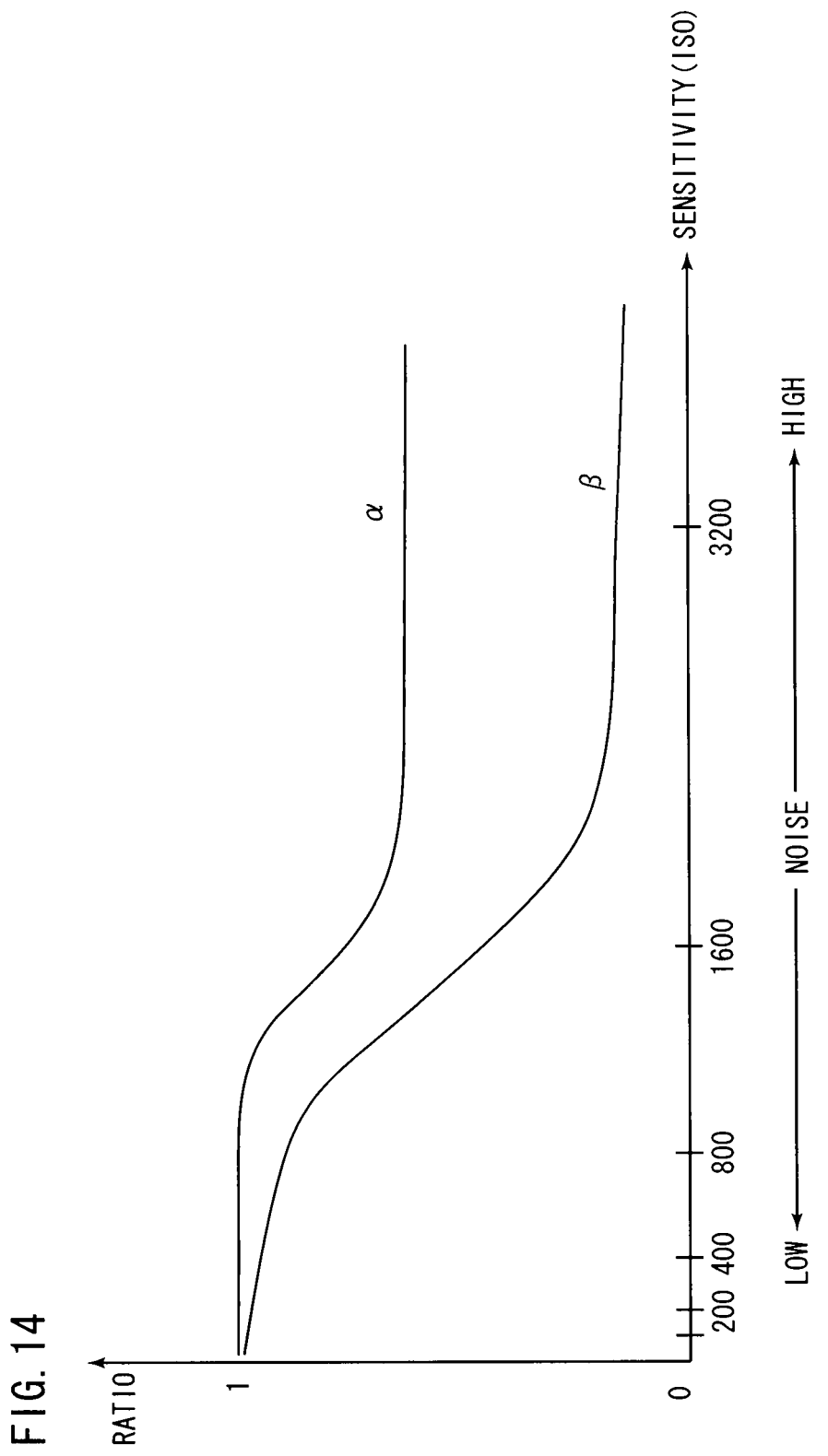
FIG. 14 is a graph showing a relation between the photographic sensitivity and the weighting factors.

FIG. 14 is a graph showing a relation between the photographic sensitivity and the weighting factors α and β. As shown in FIG. 14, as the photographic sensitivity becomes higher, the values of the factors α and β become smaller. It is thereby possible to weight the output from the second color space conversion part 342 to evaluate the correlation low when the photographic sensitivity is high and weight the output from the first color space conversion part 341 to evaluate the correlation highly when the photographic sensitivity is low.

Other Preferred Embodiments

In the above-discussed first and second preferred embodiments, two types of interpolation processes, i.e., the interpolation process with the correlation evaluated highly and the interpolation process with the correlation evaluated low, are performed separately. In a case where a RAW image having low photographic sensitivity and low noise is inputted as a pixel signal, however, both the first correlation judgment part 321 and the second correlation judgment part 322 may perform the interpolation process with the correlation evaluated highly. In other words, both the first correlation judgment part 321 and the second correlation judgment part 322 may use the correspondence shown in FIG. 5 or 10. Alternatively, in a case of inputting a RAW image having low noise, the first color space conversion part 341 may output both the luminance signal and the color difference signals.

Further, in the second preferred embodiment, judgment on whether the correspondence shown in FIG. 5 or 6 (correspondence in vertical or horizontal direction) or the correspondence shown in FIG. 10 or 11 (correspondence in diagonal direction) is used is made depending on which of the four directions where the correlation is smallest. Another method may be adopted in which a correlation-value differential absolute value in the vertical and horizontal directions and a correlation-value differential absolute value in the diagonal A direction and the diagonal B direction are compared with each other. Specifically, the comparison between |Cvertical−Chorizontal| and |CdiagonalA−CdiagonalB| is made and the pair of directions with the larger value is selected. For example, if the value of |Cvertical−Chorizontal| is larger than the value of |CdiagonalA−CdiagonalB|, the first correlation judgment part 321 uses the correspondence shown in FIG. 5 and the second correlation judgment part 322 uses the correspondence shown in FIG. 6. In other words, since the correlation values in the vertical and horizontal directions are biased more, it is judged that the correlation in either of the vertical and horizontal directions is high. Conversely, if the value of |CdiagonalA−CdiagonalB| is larger than the value of |Cvertical−Chorizontal|, the first correlation judgment part 321 uses the correspondence shown in FIG. 10 and the second correlation judgment part 322 uses the correspondence shown in FIG. 11.

Further, in the first preferred embodiment, when the correlation direction is the vertical or horizontal direction, the pixel interpolation is performed by using the pixels on the line in the vertical or horizontal direction. As another method, the interpolation using the pixels in both directions may be performed by weighting. For example, in a case where it is judged by the correspondence shown in FIG. 5 that the correlation in the vertical direction is high, the pixel on the line in the vertical direction is multiplied by a high weighting factor and the pixel on the line in the horizontal direction is multiplied by a low weighting factor and then the sum of these values is used as the interpolation value. Similarly, in the second preferred embodiment, in a case where it is judged by the correspondence shown in FIG. 10 that the correlation in the diagonal A direction is high, the pixel on the line in the diagonal A direction is multiplied by a high weighting factor and the pixel on the line in the diagonal B direction is multiplied by a low weighting factor and then the sum of these values is used as the interpolation value.

Though the four directions, i.e., the vertical direction, the horizontal direction, the diagonal A direction and the diagonal B direction, are adopted as the directions for obtaining the correlation values in the second preferred embodiment, this is one example. Correlation values may be obtained in six, eight or more directions. Further, the angle of diagonal direction is not particularly limited. Furthermore, though discussion has been made on the case where the color filter 11 is a color filter of RGB system and the RGB signals are converted into the YUV signals in the above preferred embodiments, this is one example. The present invention can be applied to a case where signals of YMCK system are converted into YUV signals.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus, comprising:
    an input part configured to input a pixel signal for each pixel, which includes a signal for one or more color components in a first color space;
    a correlation calculation part configured to calculate a first correlation value in a first direction of a specified pixel and a second correlation value in a second direction of the specified pixel by using pixel signals in a predetermined area around said specified pixel;
    a first pixel interpolation part configured to determine a first pixel interpolation process for the specified pixel based on a first evaluation function of the first correlation value and the second correlation value, and perform the determined first pixel interpolation process on the specified pixel;
    a second pixel interpolation part configured to determine a second pixel interpolation process for the specified pixel based on a second evaluation function of the first correlation value and the second correlation value, the second evaluation function being different from the first evaluation function and perform the determined second pixel interpolation process on the specified pixel;
    a first color space conversion part configured to generate one or more color component signals in a second color space from a pixel signal generated by said first pixel interpolation part; and
    a second color space conversion part configured to generate the other color component signals in said second color space from a pixel signal generated by said second pixel interpolation part,
    wherein the first pixel interpolation part is configured to perform said first pixel interpolation process, which evaluates the correlation values highly as compared with said second pixel interpolation process.

2. The image processing apparatus according to claim 1, wherein the first color space conversion part is configured to generate said one or more color component signals in said second color space, the one or more color component signals including a luminance signal in said second color space.

3. The image processing apparatus according to claim 1, wherein the second color space conversion part is configured to generate said other color component signals in said second color space, the other color component signals including a color difference signal in said second color space.

4. The image processing apparatus according to claim 1, wherein said first color space conversion part is configured to generate all the signals in said second color space under a predetermined photographing condition.

5. The image processing apparatus according to claim 1, wherein the first pixel interpolation part is configured to perform said first pixel interpolation process, which determines a degree of evaluation for the correlation values in accordance with a level of photographic sensitivity.

6. The image processing apparatus according to claim 1, wherein the second pixel interpolation part is configured to perform said second pixel interpolation process, which determines a degree of evaluation for the correlation values in accordance with a level of photographic sensitivity.

7. An image processing apparatus, comprising:
    an input part configured to input a pixel signal for each pixel, which includes a signal for one or more color components in a first color space;
    a correlation calculation part configured to calculate a first correlation value in a first direction of a specified pixel and a second correlation value in a second direction of the specified pixel by using pixel signals in a predetermined area around said specified pixel;
    a first pixel interpolation part configured to determine a first pixel interpolation process for the specified pixel based on a first evaluation function of the first correlation value and the second correlation value, and perform the determined first pixel interpolation process on the specified pixel;
    a second pixel interpolation part configured to determine a second pixel interpolation process for the specified pixel based on a second evaluation function of the first correlation value and the second correlation value, the second evaluation function being different from the first evaluation function, and perform the determined second pixel interpolation process on the specified pixel;
    a first color space conversion part configured to generate a first pixel signal for a second color space from a pixel signal generated by said first pixel interpolation part;
    a second color space conversion part configured to generate a second pixel signal for said second color space from a pixel signal generated by said second pixel interpolation part; and
    a weighting output part configured to perform weighting addition of the first pixel signal for said second color space that is generated by said first color space conversion part and the second pixel signal for said second color space that is generated by said second color space conversion part, to output a pixel signal for said second color space,
    wherein the first pixel interpolation part is configured to perform said first pixel interpolation process, which evaluates the correlation values highly as compared with said second pixel interpolation process.

8. The image processing apparatus according to claim 7, wherein the first color space conversion part is configured to generate said first pixel signal in said second color space, which includes a luminance signal in said second color space.

9. The image processing apparatus according to claim 7, wherein the second color space conversion part is configured to generate said second pixel signal in said second color space, which includes a color difference signal in said second color space.

10. The image processing apparatus according to claim 7, wherein said weighting output part is configured to determine a weighting factor in accordance with a level of photographic sensitivity.

11. The image processing apparatus of claim 1, wherein the first pixel interpolation part selects one of a plurality of pixel interpolation processes based on the first correlation value and the second correlation value; and the second pixel interpolation part selects one of the plurality of pixel interpolation processes based on the first correlation value and the second correlation value.

* * * * *